US006904510B1

(12) United States Patent
Sijstermans

(10) Patent No.: US 6,904,510 B1
(45) Date of Patent: Jun. 7, 2005

(54) DATA PROCESSOR HAVING A RESPECTIVE MULTIPLEXER FOR EACH PARTICULAR FIELD

(75) Inventor: Fransiscus W. Sijstermans, Mountain View, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 688 days.

(21) Appl. No.: 09/414,458

(22) Filed: Oct. 7, 1999

(30) Foreign Application Priority Data

Oct. 9, 1998 (EP) .......................................... 98203397

(51) Int. Cl.[7] .............................................. G06F 17/00
(52) U.S. Cl. ................................................ 712/9; 712/5
(58) Field of Search ...................... 712/5, 9, 7

(56) References Cited

U.S. PATENT DOCUMENTS 5,598,571 A * 1/1997 Gallup et al. .................. 395/8
5,623,650 A    4/1997 Beard et al. ................ 395/581
5,748,515 A * 5/1998 Glass et al. ............... 364/736.5
5,881,257 A * 3/1999 Glass et al. ................. 395/376
5,969,975 A * 10/1999 Glass et al. ............. 364/736.01

FOREIGN PATENT DOCUMENTS

EP    0463975 A2    1/1992    ............. G06F/9/30
GB    2317469 A     3/1998    ........... G06F/9/312

* cited by examiner

*Primary Examiner*—Eddie Chan
*Assistant Examiner*—Tonia L. Meonske
(74) *Attorney, Agent, or Firm*—Michael J. Ure

(57) ABSTRACT

A data processor that can perform instructions in parallel on respective fields in an operand includes a respective multiplexer for each of the respective fields. Each respective multiplexer is controlled by condition data for a particular field, preferably from an addressable storage unit. The condition may take three or more values for each field, which allows multiplexing between three or more values, reflecting a less than, equal to, or greater than relation between respective compare inputs. The inputs of the multiplexers can share read ports to a register file with more than one functional unit connected to only two read ports.

9 Claims, 3 Drawing Sheets

INSTRUCTION FORMAT

REGISTER-PACKED DATA FORMAT

DATA PROCESSOR HAVING A RESPECTIVE MULTIPLEXER FOR EACH PARTICULAR FIELD

BACKGROUND OF THE INVENTION

1. Field of the Invention

The inventions relates to a vector processor.

U.S. Pat. No. 5,623,650 discloses a vector processor. The vector processor executes vector instructions that use an operand which is made up of a number of vector components. In response to the vector instruction, the vector processor executes an operation in a number of times in parallel, using a different vector components of the operand.

2. Description of the Related Art

For data processors in general, the use of conditional execution of instructions is known. The data processor executes a conditional instruction dependent on a condition value.

The vector processor of U.S. Pat. No. 5,623,650 has refined the concept of conditional execution for vector processing. This vector processor has a vector condition register to which it can write a respective of condition value for each vector component. Upon executing a conditional instruction the vector processor executes operations only on those components of the operand for which the corresponding condition value is true.

This requires the ability to write back the components of a result of the conditional instruction independent of one another. Such an ability requires a complex design of the data processor. This ability is inconsistent with simpler designs that can only choose between conditionally writing back either all components or none.

This is the case for example with a processor that has both instructions for "normal" (non-vector) operations and instructions for vector operations. The instructions for normal operations refer to operand and result registers which each store N bits, that are treated by the normal operation as N bit numbers (N=64 for example). The instructions for vector operation refer to the same operand and result registers in the same way as the normal operations, but in the vector operations the bits in the registers are treated as 11 (M=4 for example) N/M bit numbers. Normal operations write back an N bit result as a whole. No provisions are needed to write back parts of the N bits selectively, leaving other parts of the N bits as they were before writing. This leads to a simple access mechanism to the registers. It is undesirable to modify this access mechanism for the vector operations with an unmodified access mechanism only possible to write back all components of the vector or none.

SUMMARY OF THE INVENTION

The data processor according to a first aspect of the invention comprises a respective multiplexer for each field. When the processor executes a conditional assignment instruction the multiplexer is controlled by condition data for that particular field, preferably taken from a storage unit that is addressed in the instruction as any other operand. Thus all fields of the result can be written back, the content of each field being dependent on the condition data.

In an embodiment, the condition data may take three or more values for each field, which allows multiplexing between three or more values.

A processor according to the invention has a compare instruction produces compare results that can assume three or more values, reflecting a less than, equal to, greater than relation between the compare inputs respectively.

Preferably, the inputs of the multiplexers share read ports to a register file with more than one functional unit connected to only two read ports.

Some processors, such as VLIW processors (very large instruction word processors) contain a number of functional units capable of executing different instructions in parallel. The processor contains a multiport register file with read ports. Instructions are issued in respective issue slots and contain register addresses. The addresses are taken from predetermined positions in the issue slots. Each predetermined position is associated with a fixed read port. The address taken from a position is supplied to the read port associated with that position. Thus, the address can be supplied before the instruction is further decoded. The read ports are coupled to the functional units for supplying the operands of an instruction.

Normal functional units have need at most two operands. But a functional unit for performing such as the multiplex operation has to be connected to at least three read ports of the register file. In many instruction cycles this functional unit will not be used. In order not to waste its read ports in those cycle, one therefore spreads instructions for the multiplexing functional unit over more than one issue slot. Thus sufficient read ports will be available and in processing cycles when the multiplexing functional unit is not used the issue slots can be used by more than one normal functional unit.

BRIEF DESCRIPTION OF THE DRAWINGS

These and other advantageous aspects of the invention will be described using the following figures

DETAILED DESCRIPTION OF THE PREFERRED EMBODIMENT

Figure 1:
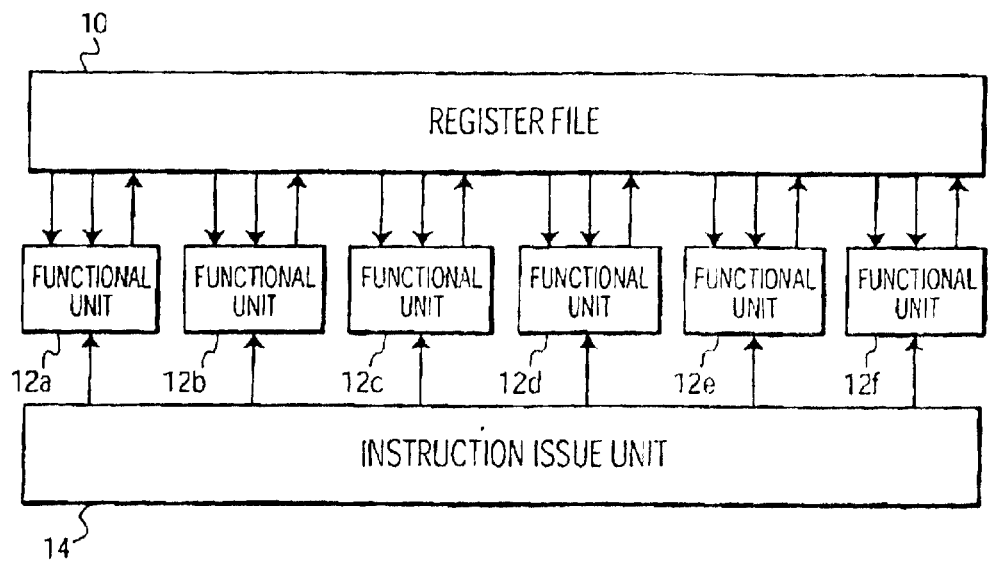
FIG. 1 shows an architecture of a data processor

FIG. 1 shows the architecture of a data processor. By way of example a VLIW processor has been shown, although the invention is not limited to VLIW processors. The processor contains a register file 10, a number of functional units 12a–f and an instruction issue unit 14. The instruction issue unit 14 has instruction issue connections to the functional units 12a–f. The functional units 12a–f are connected to the register file 10 via read and write ports.

In operation, the instruction issue unit 14 fetches successive instructions words from an instruction memory (not shown explicitly). Each instruction word may contain several instructions for the functional units 12a–f.

Figure 2:
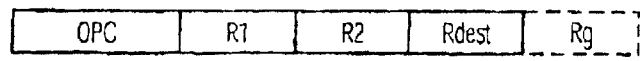
FIG. 2 shows an instruction format

FIG. 2 shows an example of an instruction. The instruction contains a number of fields, viz. a field OPC for an opcode, a field R1 for a first source register address, a field R2 for a second source register address, a field Rdest for a result register address and optionally a field Rg for a guard register address.

The instruction issue unit 14 issues individual instructions from the instruction word in parallel to respective ones of the functional units 12a–f. In response to the instructions the contents of the source registers addressed in the fields R1, R2 for source register addresses are fetched from the register file 10. The functional unit 12a–f processes the instruction according to the opcode from the field for the opcode and writes back a result of processing to the register file 12, into the register addressed by the address in the field for the result register address Rdest. Optionally, writing back is conditional on the content of the register addressed by the field Rg for the guard register address.

A number of functional units 12a–f is capable of treating the content of the addressed registers as a vector of numbers in a packed data format.

Normal instructions use the content of each of the source registers and the destination register as a single number. For example, if the registers are 64 bit long, a normal "ADD" instruction causes a functional unit 12a–f to add two 64 bit numbers loaded from the source registers in the register file 10 and places a 64 bit result in the destination register in the register file 10. Similarly a normal shift instruction causes a functional unit 12a–f to shift bits through a 64 bit register. Execution of such normal instructions requires a step for loading data from the register file 10, a step for executing the relevant operation and a step for writing the result.

In addition, one ore more functional units 12a–f are capable of executing instructions that use the content of the registers as a vector of packed data.

Figure 3:
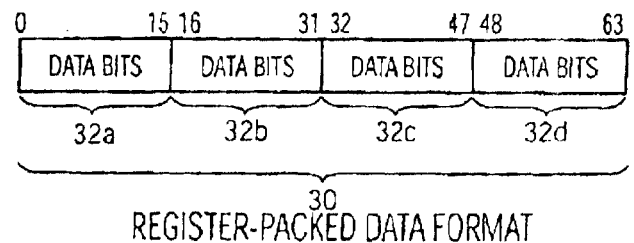
FIG. 3 shows a packed data format

FIG. 3 shows an example of a packed data format. The data format shows a possible register content. The register content 30 is subdivided into four equal length fields 32a–d of bits. By way of example, the register content may consist of 64 bits and each field may consist of 16 bits.

When a functional unit 12a–f executes certain instructions, it treats the data in the source and/or destination registers of those instructions as packed data. For example, in case of an add instruction, pairs of corresponding fields 32a–d may be added, each pair consisting of one field from the first source register and one field from the second source register. In this example, the result of the addition of each pair is written to a respective one of the fields 32a–d in the destination register. The additions of different pairs are independent, so there is no carry interaction from one field to another.

The number of steps needed for executing an instruction that treats the content of registers as packed data is generally the same as that needed for executing a normal instruction, so that in the same time a multiple of operations can be performed. Generally speaking, one step is used for loading the content of the source registers (that is, all of the packed data is loaded in one step in the same time-span as used for loading the content of a register that is treated as a single number). Generally speaking, one step is used for executing the relevant operations, i.e. the operations on different packed numbers from one register are executed in parallel. Generally speaking one step is used for writing into the destination registers, that is, all of the packed data is written in one step in the same time-span as used for writing the content of a register that is treated as a single number.

Figure 4:
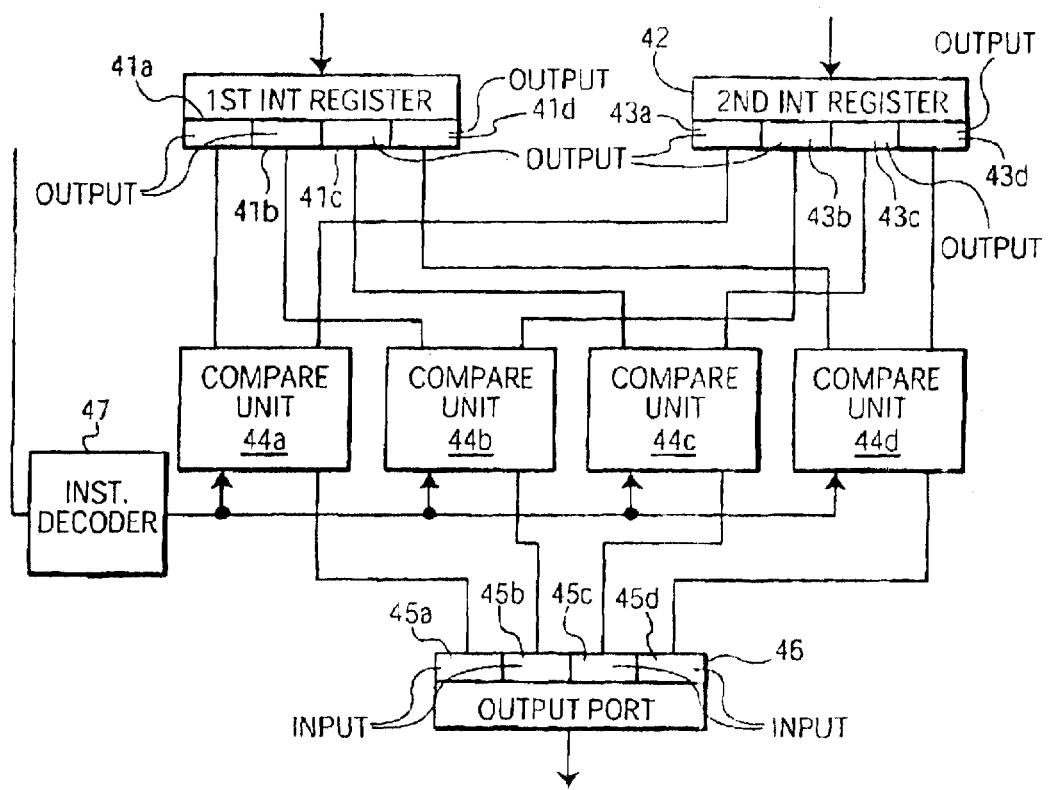
FIG. 4 shows a functional unit for use in a data processor

FIG. 4 shows a functional unit for use in a data processor. The functional unit contains a first and second intermediate register 40, 42, compare units 44a–d, an output port 46 and an instruction decoder 47. The first and second intermediate register each have four output sections 41a–d, 43a–d, coupled to respective ones of the compare units 44a–d. The compare units 44a–d each have an output. The outputs of the compare units are coupled to respective input sections 45a–d of the output port 46. The instruction decoder 47 has an output coupled to the functional units 44a–d in parallel.

In the processor architecture, the inputs of the first and second intermediate register 40, 42 are connected to respective read ports of the register file, for receiving the content of the registers that are addressed as source registers by an instruction. An input of the instruction decoder 47 receives the opcode of the instruction or a derivative of that opcode. The output of the output port is coupled to a write port of the register file, for writing a result to the result register addressed in the instruction.

In operation, the intermediate registers 40, 42 receive the contents of the source registers that are addressed in the instruction. The output sections 41a–d, 43a–d output respective fields from this content to the compare units 44a–d. Each compare unit 44a–d is associated with a field at a respective position. Each compare unit 44a–d receives the content of fields from the two source registers at the position with which the compare unit 44a–d is associated. The compare units 44a–d all perform the same type of comparison operation between the contents of the two fields, for example a "compare equal" operation, or a "compare not equal", or a "compare less than" operation etc. The instruction decoder 47 selects the appropriate comparison operation with a control signal derived from the opcode.

Each compare units 44a–d forms a compare result for its particular inputs and supplies that result to a respective input section 45a–d of the output port 46. The output port 46 feeds a result to the register file. The result is subdivided into fields in the same way as the source registers. Each field contains a compare result for a respective pair of fields.

The compare units 44a–d may be dedicated compare units, only capable of executing compare instructions, or arithmetic/logic units (ALU's) also capable of generating outputs representing numeric data resulting of arithmetic operations like addition, subtraction etc. In this context, it should be noted that a comparison result represents whether a specified relation such as "not-equal" holds between the content of the two source fields. The comparison result can only take one of a limited number of values and remains the same for a whole range of possible values of the content as long as the relation holds. This is in contrast to numeric data from arithmetic operations, which can take values from a much larger range and vary as the content of the source field changes.

Compare instructions may be denoted as follows:

eql_4 R1,R2,R3

Here eql_4 is a mnemonic symbol for the opcode that refers to a test for equality of four fields in two source registers. R1, R2 denote references to the source registers and R3 denotes a reference to a destination registers. The content of the fields in these registers will be denoted by R1[0], R1[1], R1[2] and R1[3] (bits 0–15, 16–31, 32–47 and 48–63 of register R1 respectively) and similarly for R2 and R3. The effect of the "eql_4" instruction is that R3[0]=1 if R1[0]=R2[0] and 0 otherwise R3[1]=1 if R1[1]=R2[1] and 0 otherwise R3[2]=1 if R1[2]=R2[2] and 0 otherwise R3[3]=1 if R1[3]=R2[3] and 0 otherwise Similarly, a greater than instruction gtr_4 may be denoted by gtr_4 R1,R2,R3 and has the effect that

R3[0]=1 if R1[0]>R2[0] and 0 otherwise

R3[1]=1 if R1[1]>R2[1] and 0 otherwise

R3[2]=1 if R1[2]>R2[2] and 0 otherwise

R3[3]=1 if R1[3]>R2[3] and 0 otherwise

A number of comparison operations, such as eql_4 and gtr_4, produces one of two possible values, representing truth and falsehood of the specified relation between the source fields respectively. According to the invention, some of the comparison operations may produce one of a larger number of possible comparison values (the number being fixed for the operation). For example, a compare "less than/equal/greater than" compare operation may produce one of three results, selected depending on whether the first input received by the compare unit 44a–d is less than/equal/ greater than the second input.

cmp_4 is an example of such an instruction. The instruction cmp_4 R1,R2,R3 has the effect that

R3[0]=2 if R1[0]>R2[0], 1 if R1[0]=R2[0] and 0 otherwise

R3[1]=2 if R1[1]>R2[1], 1 if R1[0]=R2[0] and 0 otherwise

R3[2]=2 if R1[2]>R2[2], 1 if R1[0]=R2[0] and 0 otherwise

R3[3]=2 if R1[3]>R2[3], 1 if R1[0]=R2[0] and 0 otherwise

Although FIG. 4 shows a functional unit for handling register contents as four fields containing four independent numbers (e.g. four 16 bit numbers of a 64 bit register), other subdivisions of registers into fields may also be used. For example, one may use a eq_2 instruction:

eq_2 R1,R2,R3 with the effect

R3[0]=1 if R1[0]=R2[0] and 0 otherwise

R3[1]=1 if R1[1]=R2[1] and 0 otherwise (in this case R1[0] denotes bits 0–31 and R1[1] denotes bits 32–64 in case of a 64 bit register).

Preferably, the functional unit adapts the subdivision into fields depending on the opcode received by the instruction decoder 47. To realize this, the instruction decoder 47 for example derives a control signal representing the subdivision specified by the opcode. This control signal is supplied to the output sections 41a–d, 43a–d of the intermediate registers 40, 42. In response the output sections 41a–d, 43a–d supply for example either respective 8 bit, 16 bit 32 bit or 64 bit fields to the compare units 44a–d, if necessary extended with additional bits to provide the right number of bits to the compare units 44a–d.

Similarly, the input sections 45a–d of the output port 46 may receive the control signal from the instruction decoder 47 and in response take compare results from for example 1, 2, 4 or 8 (4 not shown) of the compare units 44a–d and place these results in 1, 2, 4 or 8 fields of respectively 64, 32, 16 or 8 bits in the result output to the result register.

For handling fields of different size, at least some of the compare units compare units 44a–d should be dimensioned so that they can handle the maximum possible number of bits in a field received tom the intermediate registers 40, 42. Not all of the compare units need to be able to this number of bits, since the fields will be smaller when more compare units 44a–d are needed for more fields. For example, in case of 64 bit registers, the first compare unit 44a may be 64 bit wide, the second compare unit 44b 32 bit wide, the third and fourth compare unit 44c–d 16 bits wide, the next four compare units (not shown) 8 bits wide.

Figure 5:
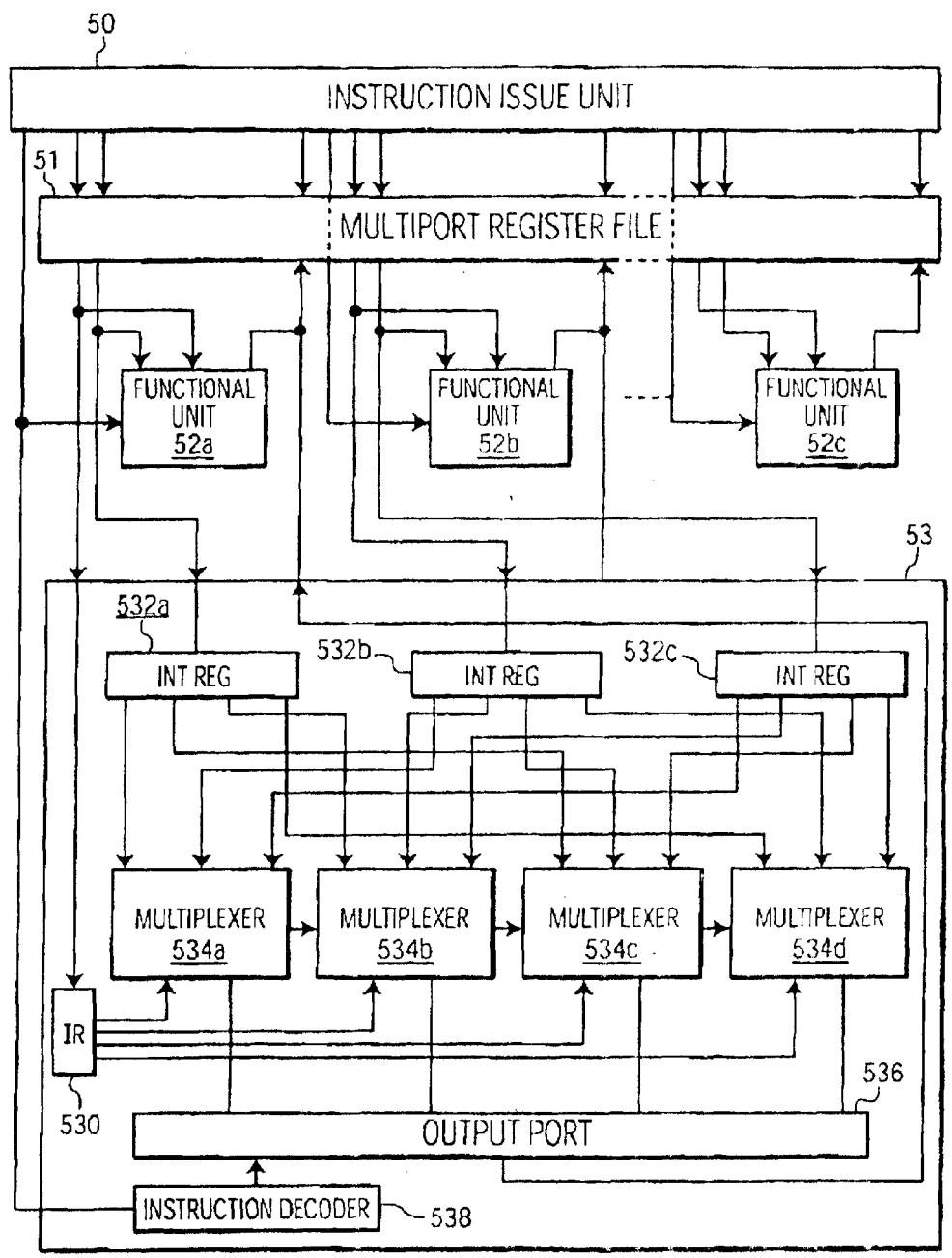
FIG. 5 shows a further architecture of a data processor.

FIG. 5 shows a further processor architecture. This architecture contains an instruction issue unit 50, a multiport register file 51 and a number of normal functional units 52a–c and a special functional unit 53. The instruction issue unit 50 has outputs coupled to address inputs of read and write ports of the register file 51, and to opcode inputs of the functional units 52a–c, 53. The register file 51 has read port data outputs and write port data inputs coupled to the functional units.

The special functional unit 53 contains a first, second, third and fourth intermediate register 530, 532a–c, four multiplexers 534a–d, an output port 536 and an instruction decoder 538. An input of the instruction decoder is coupled to the opcode output of the instruction issue unit 50 in parallel to a first one of the normal functional units 52a–c. Inputs of the intermediate registers 530, 532a–c are connected in parallel to first and second inputs of a first and second one of the normal functional units 52a–b. An output of the special functional unit is coupled in parallel with an output of the first one of the functional units 52a.

The intermediate registers 532a–c, 530 have output sections, each for a respective one of the fields into which the register content is subdivided, coupled to respective ones of the multiplexers 534a–d. The multiplexers 534a–d have outputs coupled to respective input sections of the output port 536.

In operation, the source register fields of instructions issued by the instruction issue unit are supplied to read ports of the register file 51. The opcode fields of these instructions are issued to the functional units 52a–c, 53. Dependent on the content of the opcode fields, either the normal functional units 52a,b or the special functional unit 53 starts executing the instruction, using operand data from the read ports that have received addresses from the source operand fields of the register. Thus, the content of the source registers (read via the read ports) may be used either in parallel by two normal functional unit 52a,b for executing two different instructions, or by one special functional unit 53 for one instruction. The normal functional units 52a, 52b on one hand and the special functional unit 53 cannot start executing instructions at the same time, but other functional units 53c can.

Instruction words issued by the instruction issue unit 50 are normally made up of a plurality of instructions, each issued as a respective "issue slot". An issue slot provides two source register addresses, one result register address and an opcode. Each issue slot is connected to the address inputs of two read ports and one write port, for supplying the source register addresses and the result register address respectively. The issue slot is also connected to a group of functional units for supplying the opcode.

Each normal functional unit 52a–c is connected to the output for the opcode of one issue slot and to the data inputs and outputs of that issue slot. Normal functional units 52a–c can therefore have at most two operands. The special functional unit 53 is connected to the read ports of two such issue slots and to the opcode output of one of those issue slots. Dependent on the opcodes issued by the instruction issue unit 50, the special functional unit 53 may be activated, or the two normal functional units 52a,b that are connected to the same issue slots, or one of those normal functional units 52,a,b or none of them.

If the opcode indicates that the instruction should be executed by the special functional unit 53, the special functional unit 53 uses information from respective fields of the first intermediate register 530 to control respective ones of the multiplexers 534a–d. In response, each multiplexer passes the contents of the field at a predetermined position of data from a selected one of the second, third and fourth intermediate registers 532a–c. The output port 556 places the fields that are passed by the multiplexers in respective fields of the result that is written back to the register file into the register addressed by the destination address in the instruction.

An instruction for the special functional unit may be for example denoted by

MUX R1,R2,R3,R4,R5 with the effect that

R5[0]=R2[0] if R1[0]=0, R3[0] if R1[0]=1 and R4[0] otherwise

R5[1]=R2[1] if R1[1]=0, R3[1] if R1[0]=1 and R4[1] otherwise

R5[0]=R2[2] if R1[2]=0, R3[2] if R1[2]=1 and R4[2] otherwise

R5[3]=R2[3] if R1[3]=0, R3[3] if R1[3]=1 and R4[3] otherwise

The content of the register R1 from the register file 51 from which the first intermediate register 530 is loaded has preferably been written by the type of compare instruction (eq_2, eq_4, cmp_4 etc.) described in the context of FIG. 4.

So for example the instruction sequence cmp_4 R1,R2,R3 mux_4 R3,R1,R2,R2,R4 loads in each of the fields of R4 the greatest of the contents of the corresponding fields of R1 and R2:

R4[0]=max(R1[0],R2[0])

R4[1]=max(R1[1],R2[1])

R4[2]=max(R1[2],R2[2])

R4[3]=max(R1[3],R2[3])

Other use can also be made of these instructions. For example, cmp_4 R1,R2,R3 mux_4 R3,R5,R6,R7,R8 can be used to load values from the fields of either R5, R5 or R7 into R8 dependent on the relative values of the fields of R1 and R2.

Although the special functional unit 53 is shown for the example of registers subdivided into four fields, other subdivisions, such as into two or eight fields may be used without deviating from the invention. Separate special functional units may be used for each type of subdivision, for example in parallel to special functional unit 53, or the special functional unit may be designed to adapt the subdivision in response to the type of subdivision specified by the opcode of the instruction.

Although the special functional unit 53 is shown to have three intermediate registers 532a–c with fields that are multiplexed by the multiplexers, one may also use no more than two such intermediate registers for multiplex inputs and multiplex between the content of these two registers, in particular in combination with compare instructions that produce only one of two values.

Furthermore, although the special functional unit 53 is shown to have one output port 556, one may also use two output ports, for example for switching the contents of different fields either to corresponding fields in one output port or to the other output port. An example of an instruction of this type is switch R1,R2,R3,R4,R5 with the effect

R4[0]=R2[0] if R1[0]=1 and R3[0] otherwise

R4[1]=R2[1] if R1[1]=1 and R3[1] otherwise

R4[2]=R2[2] if R1[2]=1 and R3[2] otherwise

R4[3]=R2[3] if R1[3]=1 and R3[3] otherwise

R5[0]=R3[0] if R1[0]=1 and R2[0] otherwise

R5[1]=R3[1] if R1[1]=1 and R2[1] otherwise

R5[2]=R3[2] if R1[2]=1 and R2[2] otherwise

R5[3]=R3[3] if R1[3]=1 and R2[3] otherwise

This may be realized for example by using two sets of multiplexers and two output ports in parallel instead of the single set of multiplexers 534a–d and output port 536 shown in FIG. 5.

Furthermore, it is not necessary to limit the values that may be assigned to different fields during multiplexing to values from corresponding fields in the operands. Instead, one might assign predetermined constant values if the control signal of the multiplexer has certain values. For example, a MUX0 instruction:

MUX0 R1,R2,R3,R4,R5 might be implemented so that

| | |
|---|---|
| R5[0]= | R2[0] if R1[0] = 0, R3[0] if R1[0] = 1, R4[0] if R1[0] = 2 and 0 otherwise |
| R5[1]= | R2[1] if R1[1] = 0, R3[1] if R1[0] = 1, R4[1] if R1[1] = 2 and 0 otherwise |
| R5[0]= | R2[2] if R1[2] = 0, R3[2] if R1[2] = 1 R4[2] if R1[2] = 2 and 0 otherwise |
| R5[3]= | R2[3] if R1[3] = 0, R3[3] if R1[3] = 1 R4[3] if R1[3] = 2 and 0 otherwise |

This can be realized by equipping the multiplexers with more inputs, one input being coupled to a 0 data setting. Of course, instructions that apply similar assignments multiplexing between fewer or more source registers R2, R3, R4 may be also be realized by varying the number of inputs to the multiplexers. Also instructions may be provided that can assign more predetermined selectable values (e.g. 0, 1, −1 etc.) in response to the condition values in register R1.

Between the intermediate registers and the inputs of the multiplexers one may insert additional processing circuits, so that the multiplexers can choose between data that has undergone different processing. For example, by connecting each output section of an intermediate register to different multiplexer inputs, once directly and once via a arithmetic inverter circuit, a MUX_PLUS_MINUS instruction

MUX_PLUS_MINUS R1,R1,R3 may be realized with the effect

R3[0]=R2[0] if R1[0]=1 and −R2[0] otherwise

R3[1]=R2[1] if R1[1]=1 and −R2[1] otherwise

R3[2]=R2[2] if R1[2]=1 and −R2[2] otherwise

R3[3]=R2[3] if R1[3]=1 and −R2[3] otherwise

In this case, a normal functional unit, with two inputs connected to the register file and one result output coupled to the register file may be used. Other operations may also be inserted. Eg adders and subtracters may be inserted to realize a MUXAB_PLUS_MINUS instruction

MUXAB_PLUS_MINUS R1,R2,R3,R4 with the effect

R4[0]=R2[0]+R3[0] if R1[0]=1 and R2[0]−R3[0] otherwise

R4[1]=R2[1]+R3[1] if R1[1]=1 and R2[1]−R3[1] otherwise

R4[2]=R2[2]+R3[2] if R1[2]=1 and R2[2]−R3[2] otherwise

R4[3]=R2[3]+R3[3] if R1[3]=1 and R2[3]−R3[3] otherwise

Any of these measures may be used in combination, for example to add selectable constants to respective fields of a register.

What is claimed is:

1. A data processor which uses storage units that are subdivisible into predetermined fields for executing instructions that cause the data processor to handle numbers from respective ones of the fields separately, an instruction set of the processor comprising a conditioned assignment instruction with operand locations for addressing storage locations of a plurality of address storage units, the data processor being arranged to respond to the conditioned assignment instruction by executing a respective operation for each field in parallel, the respective operation for each particular field being conditioned by respective condition data for that particular field, characterized in that the data processor comprises for each particular field a respective multiplexer, controlled by condition data for that particular field, the multiplexer for each particular field having a first and second input coupled to a respective port for receiving a content of that particular field in a first and second storage location addressed by a first and second one of the operand locations respectively, and an output for supplying a multiplex output to that particular field in a result of the conditioned assignment instruction.

2. A data processor according to claim 1, wherein the data processor is arranged to take a condition value from respective fields of a content of a storage location addressed in a third one of the operand locations.

3. A data processor according to claim 2, comprising:

a multiport register file comprising at least a first, second and third read port, a first and second functional unit for executing further instructions having no more than two operand locations, the first functional unit reading a content addressed by the operand locations of its instructions always from the first and second read port, the first functional unit reading a content addressed by an operand location of its instructions always from at least the third read port, a third functional unit for executing said conditioned assignment instruction, the third functional unit reading the content addressed by the first, second and third operand location of the conditioned assignment instruction always from the first, second and third read port, respectively of the multiport register file.

4. A data processor according to claim 1, wherein the multiplexers are at least three way multiplexers, responsive to at least three different values of the condition data for each particular field.

5. A data processor according to claim 4, wherein the instruction set comprises a compare instruction, the data processor responds to said compare instruction by:

(i) comparing contents of corresponding bit position fields in the plurality of address storage units, (ii) generating a comparison result selected from at least three different condition values, for each field, and (iii) writing back the comparison result to an addressed one of the storage units.

6. A data processor comprising a plurality of address storage units and having an instruction set comprising a compare instruction, the data processor responding to said compare instruction by:

(i) comparing contents of corresponding bit position fields in the plurality of address storage units, (ii) generating a comparison result selected from at least three different condition values, for each field, and (iii) writing back the comparison result to an addressed one of the storage units.

7. A data processor according to claim 5, wherein the plurality of address storage units comprises a first, second and third address storage unit, and wherein the data processor is programmed with a program that contains an instance of said compare instruction and an instance of said conditioned assignment instruction, the instance of the conditioned assignment instruction addressing the result of the compare instruction as the third one of the address storage units.

8. A data processor according to claim 1, the instruction set comprising further instructions causing the processor to handle the particular fields for each of the respective multiplexers together, the content of each address storage unit being handled as a single member.

9. A method of executing conditioned assignment with a data processor which uses a plurality of storage units that are subdivisible into predetermined fields for executing instructions that cause the data processor to handle numbers from respective ones of the fields separately, the method comprising:

(a) executing a compare instruction that causes the data processor to (i) perform a respective compare operation for each particular field, comparing numbers stored in that particular field in a first and second one of the storage units respectively, (ii) write a respective result of the respective compare operation for the particular field in that particular field in a third one of the storage units, the result being chosen from at least three values, (b) executing a conditioned assignment instruction that addresses the third one of the storage units and causes the data processor to (i) write to each particular fields of a fourth storage unit either a content of that particular field in a fifth of sixth one of the storage units, the fifth or sixth one of the storage units being selected under control of a content of the particular field in the third one of the address storage units.

* * * * *